Oct. 14, 1941.   E. SWEDMAN   2,259,186
METHOD OF APPLICATION OF REFRIGERATOR MOLDING WITH
CONCEALED SECURING NAILS
Filed Sept. 3, 1936
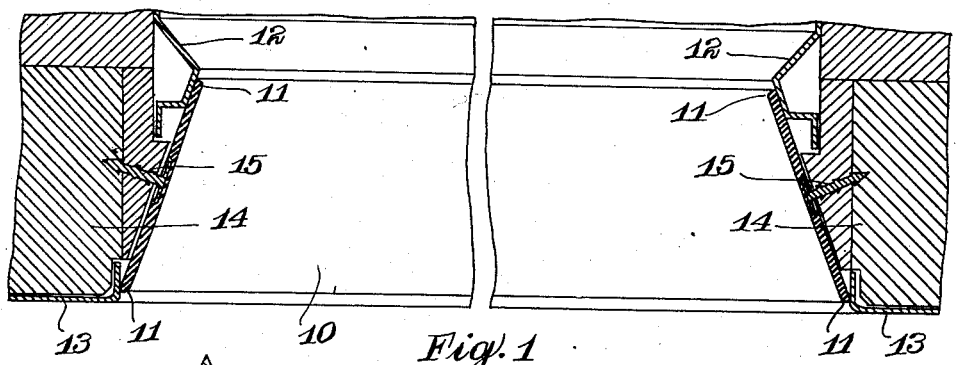
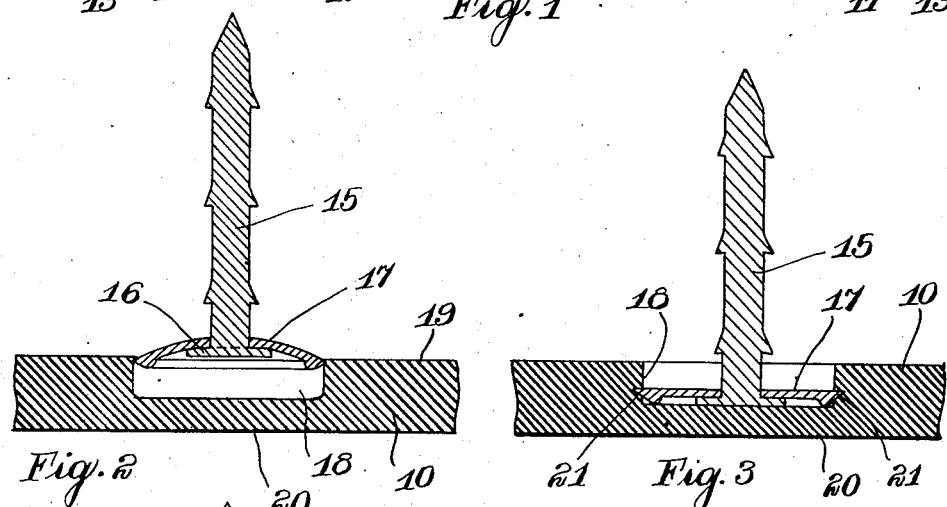
Inventor
Enoch Swedman
By
Attorney Patented Oct. 14, 1941

2,259,186

UNITED STATES PATENT OFFICE 2,259,186

METHOD OF APPLICATION OF REFRIGERATOR MOLDING WITH CONCEALED SECURING NAILS

Enoch Swedman, St. Paul, Minn., assignor to Seeger Refrigerator Company, St. Paul, Minn., a corporation of Minnesota Application September 3, 1936, Serial No. 99,315

10 Claims. (Cl. 20—74)

This invention relates to the method of application of refrigerator molding with concealed securing nails which is adapted to provide a finishing nonmetallic molding means covering the spaced apart adjoining edges of the inside and outside enamelled sheathing of a refrigerator or similar article, where it is desirable to provide a nonmetallic connecting or covering molding. In refrigerators it is extremely desirable to cover the edge of the inside sheathing as well as the outside sheathing with a nonmetallic molding so as to break the conductivity from the inside to the outside of the refrigerator. However, heretofore moldings have been used of a nonmetallic nature but in attaching these moldings the heads of the screws or nails were exposed, making an unfinished surface and also providing recesses or cracks into which moisture or dirt might collect. Where the nails or screw heads were exposed on old forms of nonmetallic molding used in refrigerators, the atmospheric changes caused a discoloration or corroding of the heads of the screws, making an undesirable appearance and not being entirely sanitary.

This method provides a means of attaching the nonmetallic molding with concealed securing nails, the heads of which are anchored in the molding, and with the outer surface of the molding formed smooth without any recesses or openings into the attaching nails.

A feature resides in providing a nonmetallic molding with recesses on the inside of the same adapted to receive the heads of the attaching nails so that when the nails are driven into the body, the heads of the nails or a washer member connected to the head, will flatten out and bury itself in the recess so as to secure the molding to the head of the nail, and thereby secure the molding in the desired position.

In carrying out this method, the attaching nails may be formed with an integral head which is of a thin, concaved character, with a sharp outer rim. The heads of these nails may be forced into a recess on the inside of the molding, flattening the heads and anchoring them in the inside of the molding. A dished washer may be used in place of the integral head construction and associated with the head of the nail which will flatten out to anchor the nail to the molding.

In the method the molding is adapted to be attached by nails or other barbs or elements which are anchored in any suitable manner to the inside of the molding so that the outside of the molding is unbroken to provide a smooth finish around door openings and the like in a refrigerator.

The drawing illustrates a detailed section in Figure 1, of a door opening of a refrigerator, showing the nonmetallic molding with the concealed nails secured to the inside of the same.

Figure 2 is an enlarged section, showing a nail about to be attached in a recess on the inside of the molding and with a construction where a dished washer is associated with the head of the nail.

Figure 3 illustrates the construction of Figure 2, after the dished washer has been flattened out, anchoring the nail in the recess of the molding.

Figure 4 illustrates another form of nail, with a thin, dished head being inserted in a nail receiving recess on the inside of the molding.

Figure 5 is an enlarged section, showing the nail of the construction of Figure 4, with the dished head flattened out to anchor the nail to the inside of the molding.

The drawing illustrates, for example, a sectional detail of a refrigerator door opening to show the manner in which the method of application of the refrigerator molding with concealed securing nails may be carried out. The molding 10 is of any suitable character and thickness and of a nonmetallic construction. The edges of the molding are beveled at 11 to fit closely to the lining 12 and the outer sheathing 13 of the refrigerator, or may be of any suitable formation.

The molding 10 is adapted to be attached to the body portion 14 of the refrigerator by nails 15 which are secured in recesses to the inside of the molding 10.

One form of securing nail 15 is illustrated in Figures 2 and 3. In this construction, the nail 15 is formed with an ordinary head 16 and a thin dished washer 17 is slipped over the nail and against the head 16. A recess 18 for receiving the washer 17 is formed on the inner surface 19 of the molding 10, while the outer surface 20 of the molding is unbroken and smooth or of any formation desired.

The molding 10 is attached to a door opening in a manner to cover the edges of the sheathing 12 and 13 as illustrated in Figure 1. The nails 15 are first attached to the molding by placing the washer 17 in the recess 18. Then by placing the same in a die or press, the nail 15 is forced into the recess 18 and at the same time the dished washer 17 is flattened out, forcing the sharp edges 21 sufficiently into the sides of the recess 18 to anchor the head of the nail 15 in the recess 18 and attach the molding 20 in place. The molding is then ready to be secured by the nails to the body 14 of the refrigerator.

In Figure 4, the nail 15' is formed with an integral, thin, large head 22, which is dished so that it may be inserted in the recess 18 and then the nails 15' are attached by placing the molding in a die as stated above. The molding 10 could be attached by striking a blow on the outside surface 20 over the head 22 of the nail 15', the nail driven into the body 14 of the refrigerator, flattening the head 22 as illustrated in Figure 5, causing the sharp edge 23 to be embedded in the recess 18, and thereby securing the molding to the nail and at the same time anchoring the molding around the opening of the refrigerator.

In carrying out my method, it is not necessary that the nails 15 or 15' be anchored in the act of attaching the molding, because the head of the nail may be previously secured in the recess, such as 18, before the molding is attached. The simple form of molding illustrated is desirable, and the method set forth is also one which will permit the attachment of the molding 10 in an easy manner. With a molding of this character, and by the method set forth, the non-metallic covering means may be readily anchored in position and a sanitary and very desirable finish may be provided for refrigerator construction in an economical manner.

I claim:

1. The method of attaching a molding having an aperture extending partially through the same from the inner surface thereof by means of a nail having a shank and a concave head thereupon, the method consisting in inserting the nail head into the aperture in said molding, placing the molding in position, and applying pressure to the outer surface of the molding to force the nail shank into anchoring position and to simultaneously flatten the concave nail head to force the edges thereof into the side walls of the aperture.

2. The method of attaching a molding having an aperture therein and extending partially therethrough, by means of a nail having a shank and a head, said head being concave and having greater area than the cross-sectional area of said aperture but designed to fit therein, said method consisting in inserting said nail head into the molding aperture with the shank projecting therefrom, placing the molding in position, and applying pressure to said molding opposite said aperture, to simultaneously drive said nail shank and to flatten said head to anchor said nail to said molding.

3. In combination, a molding and a nail; said molding having an aperture therein of predetermined diameter and extending partially through said molding; said nail having a shank projecting from said opening, and a circular head of larger diameter than said aperture, said head extending into the body of said molding at the base of said aperture.

4. In combination, a molding and a nail; said molding having an aperture therein of predetermined diameter extending partially through the same; said nail including a shank extending outwardly from said molding and a circular head of larger diameter than said aperture extending marginally into the body of said molding; and a sharp peripheral edge on said head embedded in the walls of said aperture.

5. A breaker strip comprising a panel-like body portion having a recess therein and attachment means for a fastener expanded into said recess.

6. In combination for the purpose described, a breaker strip having a recess therein, a fastening means and attachment means engaging said fastening means and expanded into said recess.

7. In combination for the purpose described, a panel, a recess in the face of said panel, a nail or like fastening having a head, a washer engaging said head, said washer being expanded into said recess.

8. In combination for the purpose described, a panel, a recess in the face of said panel, a nail or like fastening having a head, a washer engaging said head, said washer being expanded into said recess, said recess having undercut edges when said washer is expanded.

9. A breaker strip having recesses in a face thereof in combination with fastening means having heads located in said recesses, said heads being expanded to engage the sides of said recesses so as to hold said breaker strip in place when mounted.

10. A breaker strip having a recess in a face thereof in combination with a fastening means having a head located in said recess, said head being expansible and having acute angled edges adapted to undercut the sides of said recess when said head is expanded.

ENOCH SWEDMAN.